Dec. 21, 1954  K. D. DAY  2,697,361
VARIABLE SPEED CLUTCH PULLEY
Filed April 20, 1953  2 Sheets-Sheet 1

INVENTOR.
KENNETH D. DAY
BY
Lindsey and Prutzman
ATTORNEYS

Dec. 21, 1954  K. D. DAY  2,697,361

VARIABLE SPEED CLUTCH PULLEY

Filed April 20, 1953  2 Sheets-Sheet 2

INVENTOR.
KENNETH D. DAY
BY
*Lindsey and Prutzman*
ATTORNEYS

United States Patent Office 2,697,361
Patented Dec. 21, 1954

2,697,361

VARIABLE SPEED CLUTCH PULLEY

Kenneth D. Day, Windsor Locks, Conn.

Application April 20, 1953, Serial No. 349,903

5 Claims. (Cl. 74—230.17)

This invention relates to variable speed devices and pertains more particularly to a device of this general character which can be used as both a pulley and clutch.

One object of the invention is to provide a pulley which will be uniformly self-adjusting for the various loads that might be encountered, the invention contemplating the use of antifriction means rendering one pulley half readily slidable with respect to the other pulley half.

Another object of the invention is to provide a pulley capable of transmitting large amounts of torque, such a feature stemming primarily from the fact that both pulley halves are mounted for rotation in unison and, therefore, each serves as a torque transmitting member.

Another object is to provide a pulley which may be attached to conventional drive shafts without modification thereof. In this connection it will become apparent that the shaft need not be any longer nor keyed differently than is the usual shaft.

A further object of the invention resides in the use of a compression spring for urging the two pulley halves together, the spring having parts associated therewith which permit adjustment of its compression while the pulley is rotating.

A still further object of the invention is to provide a pulley which may be manually shifted to idling position, thereby serving the additional function of a clutch as well as a pulley. Such an arrangement is particularly advantageous for starting motors or engines to which the pulley is connected when the motor or engine is intended to drive a rather heavy load. In this way, the motor or engine may be started unloaded and the load connected thereto after the motor has been brought up to speed. Also, it is within the contemplation of the invention to utilize the idling position in case the load becomes excessive during operation, provision being made for automatically shifting the pulley halves to permit such idling.

Further objects of the invention reside in the provision of a pulley or clutch which may be easily assembled, which is compact, inexpensive to manufacture, reliable, and which mechanism will require little or no maintenance.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
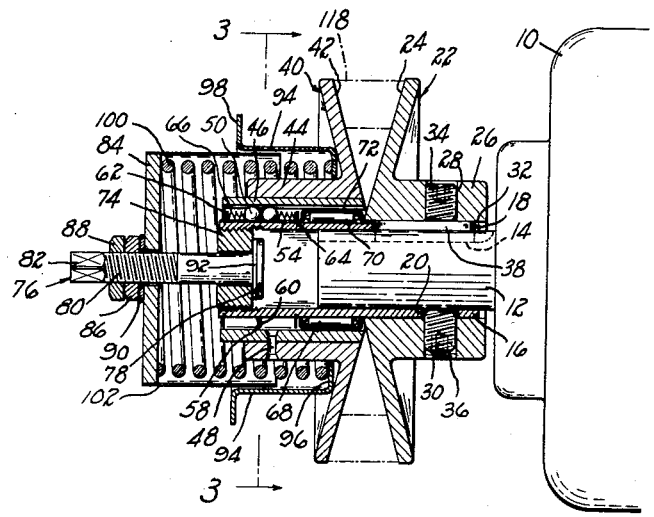
Figure 1 is a sectional view of the pulley forming the subject matter of the instant invention, the view being taken in the direction of line 1—1 of Figure 3 with the pulley being shown in a lightly loaded condition.

To illustrate the invention, there is shown a motor 10 equipped with a drive shaft 12, the drive shaft having the usual longitudinal keyway which in this instance bears the reference numeral 14. Telescoped over the shaft 12 is an inner sleeve 16 which has a slot 18 registrable with the keyway 14, and an aperture 20 which, as will presently be seen, aids in the anchoring of the sleeve against both longitudinal and rotative movement with respect to the inboard pulley half.

Rotatable with the shaft 12 is an inboard pulley half or disk 22 provided with a tapered face 24 and a hub 26 circumscribing the sleeve 16. To assure rotation of the pulley 22 with the shaft 12, the pulley half is equipped with tapped apertures 28 and 30 diametrically spaced from each other. The hub additionally includes a longitudinal keyway 32 registrable with the keyway 14 in the drive shaft 12 and the slot 18 in the inner sleeve 16. Setscrews 34 and 36 are threadedly received in the apertures 28 and 30, the setscrew 34 abutting against a key 38 contained in the keyways 14 and 32 and the setscrew 36 extending through the aperture 20 into abutting relation with the shaft 12.

The pulley also includes an outboard pulley half or disk 40 provided with a tapered face 42 and a hub 44. The hub 44 circumscribes an outer sleeve 46 and by virtue of either a press fit or the use of a plurality of rivets, one of which is shown at 48, the sleeve 46 is mounted within the pulley half 40 for rotation therewith.

Figure 3:
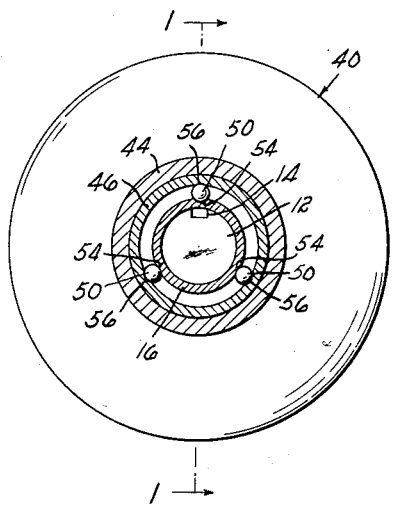
Figure 3 is a sectional view taken in the direction of line 3—3 of Figure 1.

Maintaining spaced concentricity between the inner and outer sleeves 16 and 46, respectively, are three pairs of balls 50, these balls engaging in longitudinal grooves 54 formed in the outer surface of the sleeve 16 and longitudinal grooves 56 angularly aligned therewith formed in the inner surface of the sleeve 46. As will be seen from an inspection of Figure 3, these various grooves are spaced at angles of 120° with respect to each other. Such a number of grooves has been found satisfactory for the transmission of the torque to which the pulley half 40 is subjected, for it will be appreciated that connection is thus produced via the balls 50 and the sleeves 16 and 46, since the sleeve 16 is connected to the shaft 12 for rotation therewith and the sleeve 46 has connection with the pulley half 40 for rotation with this member. A spacer ring 58, suggestively of phenolic plastic material, is interposed between the balls, and, in order to hold the spacer ring in place radially by the balls 50, it is preferable that the ring be provided with concave faces 60 corresponding in curvature to that of said balls. Also aiding in maintaining the proper position of the balls, longitudinally speaking, is a pair of snap retaining rings 62 and 64 disposed in circumferential grooves on the sleeve 16. The snap rings 62 and 64 serve as the means against which one end of each of a series of relatively small compression springs 66 abut, these compression springs keeping the balls from moving needlessly in the grooves 54 and 56. For a purpose presently to be explained, there is a needle bearing assembly circumposed about the sleeve 46, the assembly comprising a plurality of needle bearings 70 directly engaging the inner sleeve and a cage or housing 72 which is employed in holding the individual needle bearings in proper juxtaposition with respect to each other.

Threadedly received in the open end of the inner sleeve 16 is an apertured plug 74. Through this plug projects a bolt 76 equipped with a head 78, a threaded shank 80 and a flattened exposed end 82. The threaded shank portion extends through a thrust plate 84 and on the shank is an adjusting nut 86 and a locknut 88. Also there may be desirably provided a pair of thrust washers or bearings 90 and 92, one being disposed between the thrust plate 84 and the adjusting nut 86 and the other being placed intermediate the head 78 of the bolt and apertured plug 74, the use of the thrust washers permitting relative rotation of the bolt 76 with respect to the mechanism associated therewith during an adjustment operation soon to be referred to.

A shipper ring 94 is circumscribed about the hub 44 of the pulley half 40, the shipper ring including an inturned flange 96 and an outturned flange 98. For the purpose of biasing the pulley half 40 toward the other pulley half 22, there is employed a rather heavy compression spring 100, which abuts against the inturned flange 96 and the thrust plate 84. In order to protect the coils of the spring 30 from human contact and foreign matter, a cylindrical cover 102 may be shrunk or brazed to the thrust plate and such cylindrical cover is telescopically received within the shipper ring 94.

Figure 2:
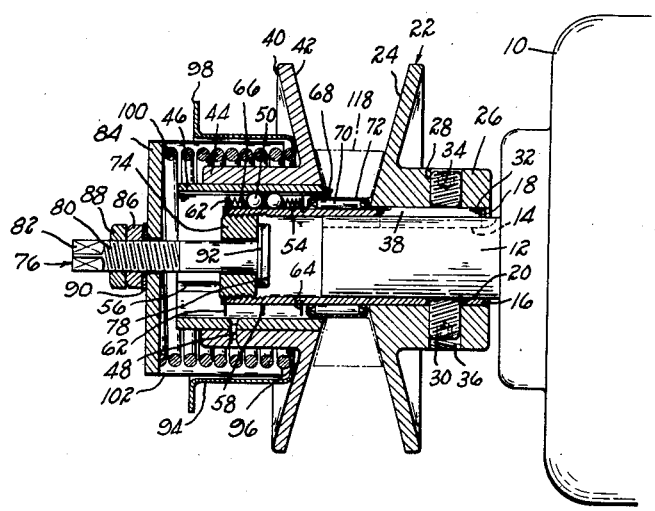
Figure 2 is a view corresponding to Figure 1 with the pulley heavily loaded, the pulley in this figure being shown in its idling position which it assumes when excessively loaded.
Figure 4:
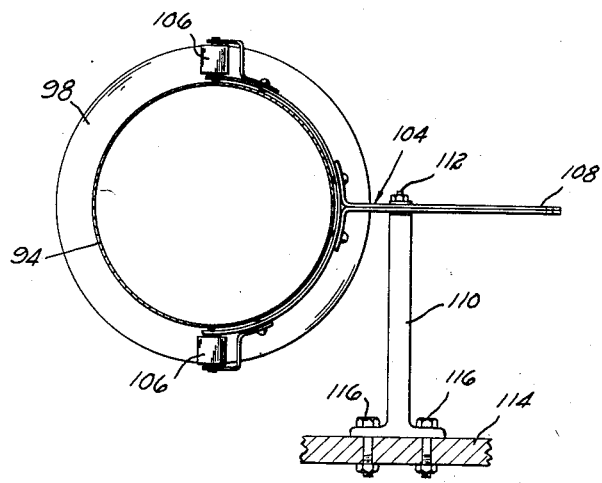
Figure 4 is a view, partly in section, illustrating an accessory which can be used to move manually the pulley into its idling position.

In order not to unduly complicate Figures 1 and 2, a shipper fork 104 is depicted in only Figure 4, although its use is contemplated in connection with the other figures as well. The fork 104 is equipped with a pair of rollers 106 which bear directly against the outturned flange 98, and at the end of the fork opposite the rollers is a handle portion 108 by means of which the fork may be actuated. The shipper fork 104 is fulcrumly mounted atop an upright standard 110 having a pivot pin 112 which passes through the shipper fork 104. In Figure 4, the standard 110 is shown placed upon a section of flooring 114 which, of course, could be merely an extension of the motor base (not shown) upon which the motor 10 is mounted. Also, if preferred, the shipper fork 104 could be pivotally mounted on a framework which is fixedly positioned with respect to the motor 10. However, in the illustrated arrangement, the standard is merely moored or anchored to the floor by means of a plurality of bolts 116.

From the foregoing description, it is felt that the operation of the pulley can be readily understood. However, a brief further explanation will probably be helpful, and to this end, a V-belt 118 is shown in phantom outline in both Figures 1 and 2. Assuming that the belt is connected to a rather heavy load and it is desired to start the motor 10 unloaded, then the shipper fork 104 may be actuated in such a direction which will cause the rollers 106 to bear against the outturned flange 98 of the shipper ring, such a pressural engagement of the rollers causing the action of the spring 100 to be overcome and the pulley half 40 is thus permitted to move longitudinally relative to the shaft 12. The balls 50, of course, facilitate such axial movement inasmuch as they roll unrestrictedly in the grooves 54 and 56 to permit longitudinal movement of the outer sleeve 46 with respect to the inner sleeve 16. Such manipulation on the part of the operator will condition the pulley so that the V-belt 118 will engage the needle bearing assembly 68 and slippage of the belt with respect to the pulley will ensue. Stated otherwise, provision is made in the form of the radial bearing assembly 68 for producing idling of the pulley, thereby causing the pulley to function also as a clutch.

Once the motor has been brought up to the desired speed, then, of course, release of the shipper fork 104 will permit the spring 100 to move the pulley half 40 toward the pulley half 22 and the belt 118 will seek its own natural radial distance in the groove formed between tapered faces 24 and 42 for the particular load then encountered. Such a belt position is illustrated in Figure 1. However, should the load increase for any reason, then the belt 118 will cam itself inwardly toward the center of the pulley with a concomitant decrease in the pulley's moment arm which is, of course, governed or opposed by the force exerted by the spring 100. In this way, there is always automatically maintained a diameter such that the reduced pulley ratio is inversely proportional to the load. During any radial shifting of the belt 118, it will be recognized that there is longitudinal movement between the sleeves 16 and 46 which movement is facilitated by the balls 50 to maintain the proper pulley diameter at all times. Should the load increase beyond the set limit, usually determined by the capacity of the motor 10 or the strength of the driven apparatus, the belt will completely separate the pulley halves and will then ride on the bearing 68. For example, if the device is employed in conjunction with a power mower, the above alluded to override feature would prevent a stick or stone from bending or breaking the mower parts as well as preventing the motor from stalling.

One important feature of the invention resides in the fact that the degree of compression of the spring 100 may be adjusted with the motor 10 in operation. Such a course of action is made possible by the use of the bolt 76 and those parts intimately associated therewith. In adjusting the spring, the motor 10 is started up with a wrench engaging the flats 82 so that the bolt can be held from rotation with the shaft 12. With the wrench still engaging the flats 82, it will be observed that the locking nut 88 may be backed off from the adjusting nut 86 sufficiently to permit axial movement of the adjusting nut in either direction along the threaded shank to decrease or increase the compressive action of the spring 100 inasmuch as one end of the spring bears against the thrust plate 84. Once having attained the proper adjustment of the nut 86 which can be determined by actually observing the behavior of the belt 118, together with keeping in mind the rating of the motor 10 and the ruggedness of the driven apparatus, then retightening of the locknut 88 against the nut 86 will assure that the spring 100 will remain in the compressive state into which it has been adjusted.

During a cycle of operation, from the preceding description it will be recognized that the belt 118 is continually shifting radially, unless the load is exactly constant, although such shifting may not be of such magnitude as to be perceptible in every instance. The radial movement of the belt 118 of course imparts longitudinal or axial movement to the outboard pulley half 40 which is transferred to the outer sleeve 46 as already explained. The balls 50 which are interpositioned between the sleeves 16 and 46 provide antifriction means for permitting such longitudinal movement of the sleeve 46. In this way, the pulley half 40 may be displaced with respect to the pulley half 22 without interference and accordingly the pulley will adjust itself even for the most minute changes in load conditions. Excessive loads, as hereinbefore indicated, will cause the belt 118 to ride directly on the radial bearing 68 (Figure 2), an idler pulley (not shown) taking up the belt slack as it would in intermediate positions between Figures 1 and 2.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. In a variable speed pulley, first and second cone-faced pulley disks, said first disk being adapted for fixed connection to a rotatable shaft, a pair of concentrically spaced inner and outer sleeves provided with opposed angularly aligned grooves, one end of said inner sleeve being adapted to encircle said shaft for rotation therewith and said outer sleeve being fixedly received within said second disk, an apertured plug fixed in the other end of said inner sleeve, an elongated bolt equipped with an enlarged head at one end and a threaded shank at the other end, the bolt projecting outwardly from the end of said inner sleeve with its head restrained by said plug, a thrust plate encircling said shank, a nut threadedly attached to the shank adjacent the free end thereof, and a compression spring interposed between said second disk and said thrust plate.

2. In a variable speed pulley, the combination of claim 1 in which the free end of said shank is flattened on opposite sides for the purpose of accommodating a wrench and in which there is a first thrust bearing intermediate the bolt head and plug and a second thrust bearing intermediate the plate and nut, whereby the compression of said spring may be adjusted while said shaft is rotating.

3. In a variable speed pulley, the combination comprising a rotatable shaft having a longitudinal keyway, an inner sleeve having one end telescoped over said shaft, said one end being provided with a slot registrable with said keyway and an aperture substantially diametrically opposite the slot, a first cone-faced pulley disk circumscribed about said one end of the inner sleeve provided with a keyway registrable with the shaft keyway, a key engaging said keyways and extending radially through said slot, said first disk having a hub with radially directed tapped apertures diametrically disposed with respect to each other, a setscrew threadedly received in each hub aperture, one setscrew abutting said key and the other extending through said inner sleeve aperture into abutting relation with said shaft, a relatively short outer sleeve concentrically spaced relative to the other end of said inner sleeve, said sleeves each being provided with three opposed, angularly aligned grooves, a plurality of ball members retained in said grooves for permitting relative axial movement between said sleeves, a second cone-faced pulley disk fixedly circumscribing said outer sleeve, a plug threadedly received in the other end of said inner sleeve provided with an aperture extending centrally therethrough, an elongated bolt equipped with an enlarged head at one end and a threaded shank at the other, the bolt projecting outwardly through the plug aperture from the inner sleeve with its head restrained by said plug, a thrust plate encircling said shank, a nut threadedly attached to the shank adjacent the free end thereof, and a compression spring interposed between said second disk and said thrust plate.

4. In a variable speed pulley, the combination of claim 3 in which the free end of said shank is flattened on opposite sides for the purpose of accommodating a wrench and in which there is a first thrust bearing intermediate the bolt head and plug and a second thrust bearing intermediate the plate and nut, whereby the compression of said spring may be adjusted while the pulley is rotating.

5. In a variable speed pulley, the combination of claim 3 in which there is a roller bearing assembly circumscribing said inner sleeve at the base of the groove formed by said cone-faced pulley disks.

References Cited in the file of this patent

UNITED STATES PATENTS

| Number | Name | Date |
| --- | --- | --- |
| 2,165,431 | Wellman | July 11, 1939 |
| 2,310,081 | Hill | Feb. 2, 1943 |
| 2,321,438 | Tyler | June 8, 1943 |

FOREIGN PATENTS

| Number | Country | Date |
| --- | --- | --- |
| 551,872 | France | Jan. 15, 1923 |